Nov. 11, 1947.  E. T. CARLSON  2,430,557
BUS BAR DUCT SYSTEM
Filed May 24, 1943
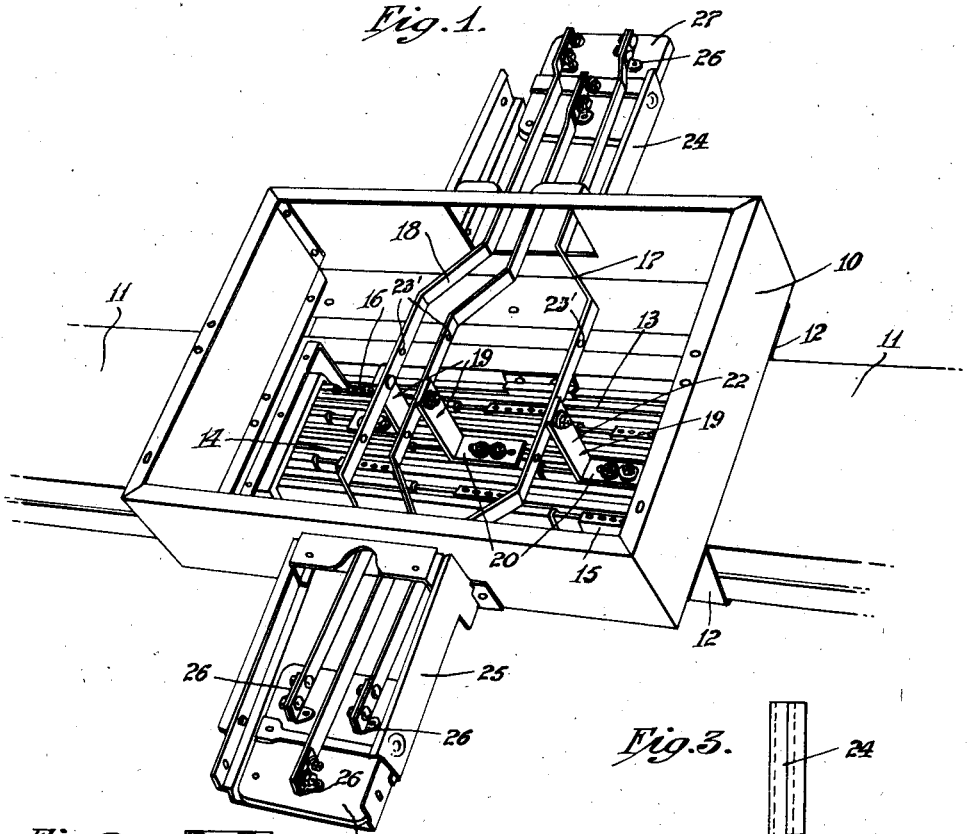
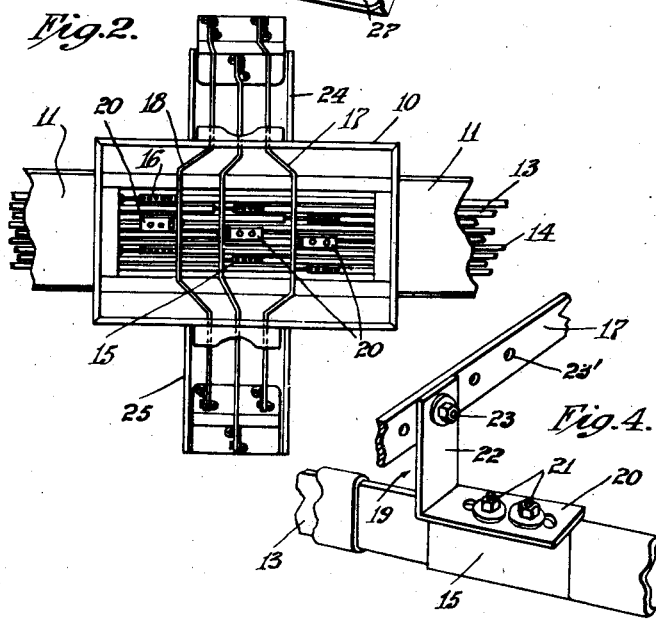
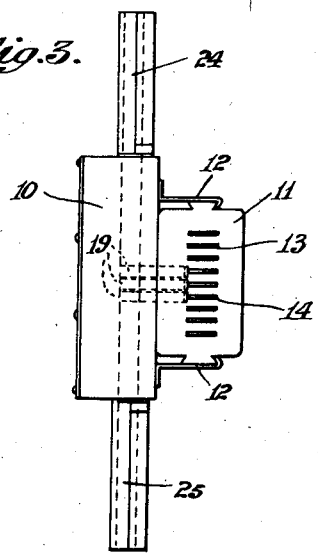
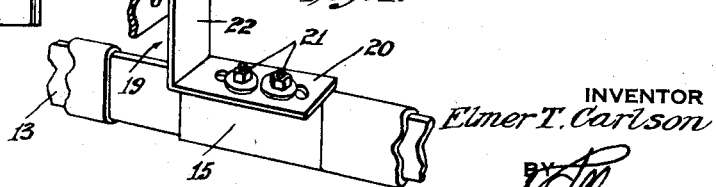
INVENTOR
Elmer T. Carlson
BY
ATTORNEY Patented Nov. 11, 1947

2,430,557

UNITED STATES PATENT OFFICE 2,430,557

BUS BAR DUCT SYSTEM

Elmer T. Carlson, Wyoming, Ohio, assignor to The Trumbull Electric Manufacturing Company, Plainville, Conn., a corporation of Connecticut Application May 24, 1943, Serial No. 488,153

4 Claims. (Cl. 174—71)

My invention relates to systems of power distribution by enclosed bus bar lines and especially to what are sometimes called radial distribution systems.

In such systems main lines are enclosed in ducts from which branches are led at various locations. When the main line is installed it is frequently impossible to tell the locations of the branches to be installed. Neither is it determinable in advance to which of the several circuits the branches are to be connected.

The main object of the invention is to provide simple but safe and convenient means of effecting such connections.

Another object is to provide a construction which is adapted to different arrangements of take-off or branch connections.

Another object is to provide a construction which is adapted to accommodate either T or X-over connections which may be attached at the joint sections of the main lines. Expressed in another way, an important object is to facilitate lateral connections to one of several circuits in a main distribution system.

To accomplish this I provide a connector box or receptacle connected to or in the main bus duct line. Through or behind this box passes the main line bus bars and to it may be connected one or more sections of branch ducts carrying the side line bus bars. The main line bus bars are provided with connector sleeves in the connector box and on these sleeves are mounted angle brackets to which the branch bus bars are connected. These branch bars may be perforated at intervals to facilitate connection to the desired main bars. It is also possible to parallel several bus bars within a circuit and to make an individual tap.

Fig. 1 is a perspective view of a fragment of a main bus bar system and a connection box with branches embodying the preferred form of my invention.

Fig. 2 is a front view of the same.

Fig. 3 is a side and sectional view of the same.

Fig. 4 is a fragmentary perspective view showing a single bus bar connection.

The duct system is preferably closed as usual. The junction box 10 may be of any suitable type to which are secured the main duct sections 11, 11 of any suitable type, parts of which are open at the front and therefore constitute part of the back of the junction box. The box may be secured on the main duct by clamps 12.

The bus bars 13, 14 may be of any suitable type and number and extend along the rear of the box. The box preferably constitutes a junction for some or all of the bus bar sections. On these bus bar sections are mounted connector sleeves 15 and 16 which constitute tap-off devices for the branch bus bars 17, 18. The sleeves are provided with spaced aligned openings in their top portions.

The branch bus bars are supported by brackets 19, 19 in the junction box. Each bracket has a foot 20 secured by screws 21 to a sleeve and a post 22 secured by a bolt or screw 23 to a cross bar at any one of several openings such as 23'. These branch bars are offset and drilled at 23', 23' to facilitate connection to the desired main bars.

These brackets 19 allow a given branch bus bar to be connected only to such main bus bars as represent electrical subdivisions of a single conductor. For example, in Fig. 1 are shown nine individual main bus bars, while there are only three electrical conductors, representing the usual three phase distribution system. The various bus bars, each representing a subdivision of a conductor are interleaved in the manner well known in the electrical distribution art. As apparent in Fig. 1, the openings 23' in any one branch bus bar are so spaced that that particular bar can be alternatively connected only to three out of the nine main bus bars. Therefore the staggered relationship of openings 23' in the various branch bus bars, as clearly indicated in Fig. 1, makes automatic and complete assurance that all three phases will appear upon the three branch bus bars, while at the same time allowing each branch bar to be connected to any desired one of the main bus bars which is a subdivision of a predetermined single conductor. This same arrangement may easily be modified to suit other polyphase circuits employing more or less than three electrical conductors, or distribution systems where each conductor is subdivided into more or less than three main bus bars.

As apparent from Figs. 1 and 2, the offsets in the various branch bus bars position each bar, and consequently the apertures 23' therein, at uniform distances and angles, from the corresponding main bus bar. Therefore all the brackets may be made uniform in size and shape, thus promoting interchangeability.

The branch connections may be made from either or both sides of the main duct for a T-connection or an X-over connection as the need may be.

The branch bars extend out through the sides of the box into branch ducts such as 24, 25 where they are supported by brackets 26 on insulation blocks 27. The branch ducts may be of any suitable type and are secured directly to the sides of the box 10. The box itself is preferably provided with a suitable cover (not shown).

From the foregoing it will be seen that such a construction makes it possible to effect various arrangements of branch connections to a main bus duct system with great simplicity.

I claim:

1. A bus bar duct system comprising a main duct containing bus bars, a junction box secured over the main duct and having an opening in front of said bus bars, a number of rigid bus bars extending through said junction box and transversely of said main bus bars, said transverse bus bars having offset portions within the junction box and brackets having two portions angularly disposed to one another in at least two dimensions connected at one of their ends to the offset portions of the transverse bus bars and connected at their other ends to the main bus bars, said transverse bus bars being each provided with a plurality of apertures for selectively connecting said brackets thereto, the apertures in each transverse bar being laterally staggered with respect to the apertures in the other transverse bars, whereby no two transverse bars can be connected to a single main bus bar.

2. A bus bar duct system comprising a main duct containing bus bars, a junction box secured over the main duct and having an opening in front of the bus bars, elongated sleeves on the bus bars in the junction box, said sleeves having spaced openings, the sleeve on one bus bar being staggered relative to the sleeve on the next bus bar, a number of rigid bus bars extending through said junction box and transversely of said main bus bars, said transverse bus bars having offset portions in the junction box provided with spaced openings, brackets having a plurality of angularly displaced portions provided with openings adapted to be aligned with the bus bar openings and the sleeve openings and means extending through said aligned openings for detachably connecting the main and transverse bus bars, said transverse bus bars being each provided with a plurality of apertures for selectively connecting said brackets thereto, the apertures in each transverse bar being laterally staggered with respect to the apertures in the other transverse bars, whereby no two transverse bars can be connected to a single main bus bar.

3. A bus bar duct system comprising a main duct containing a plurality of main feeder bars forming a set wherein each electrical conductor is represented by a plurality of discrete feeder bars, connected in parallel, a connector sleeve upon each feeder bar, the sleeves upon parallel connected bars being substantially opposite one another, branch bars extending across and adjacent to the feeder bars, with spaced connection openings opposite each of the sleeves of the several main bars which correspond to a single electrical conductor, a bracket pre-formed to extend between a sleeve of a main bar and one of the openings in the branch bar, and removable connection means for securing the bracket at one end to the main feeder sleeve and at its other end to the opening in the branch bar, whereby any one of the branch bars may be connected to only a predetermined one of such feeder bars as represent a single electrical conductor.

4. A system according to claim 3, in which said branch bar crosses above each main feeder bar at a point to one side of the sleeve upon said feeder bar, whereby said bracket is secured to said feeder bar at a point not obscured by said branch bar and whereby said removable connection means are exposed and readily accessible.

ELMER T. CARLSON.

REFERENCES CITED

The following references are of record in the file of this patent:

UNITED STATES PATENTS

| Number | Name | Date |
| --- | --- | --- |
| 252,395 | Odell | Jan. 17, 1882 |
| 502,083 | McEvoy | July 25, 1893 |
| 1,819,885 | Frank et al. | Aug. 18, 1931 |
| 1,840,887 | De Mask | Jan. 12, 1932 |
| 1,992,816 | De Mask | Feb. 26, 1935 |
| 2,218,545 | Morten | Oct. 22, 1940 |
| 2,261,857 | Novak et al. | Nov. 4, 1941 |
| 2,262,067 | Togesen et al. | Nov. 11, 1941 |
| 2,306,353 | Cole et al. | Dec. 22, 1942 |
| 2,317,710 | Anderson | Apr. 27, 1943 |
| 2,339,600 | Carlson et al. | Jan. 18, 1944 |

FOREIGN PATENTS

| Number | Country | Date |
| --- | --- | --- |
| 382,795 | Great Britain | Nov. 3, 1932 |

OTHER REFERENCES

The Trumbull Electric Mfg. Co. catalog, June, 1942, page FD9. Copy in 174—129BB. (Rec'd. in Div. 65 of the Patent Office, Dec. 8, 1942.)